United States Patent
Newell et al.

(10) Patent No.: US 6,752,948 B2
(45) Date of Patent: *Jun. 22, 2004

(54) POST PROCESSING THREE-DIMENSIONAL OBJECTS FORMED BY SELECTIVE DEPOSITION MODELING

(75) Inventors: Kenneth J. Newell, Valencia, CA (US); Stephen A. Ruatta, South Pasadena, CA (US); John S. Stockwell, Sylmar, CA (US)

(73) Assignee: 3D Systems, Inc., Valencia, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 09/970,727

(22) Filed: Oct. 3, 2001

(65) Prior Publication Data

US 2003/0085488 A1 May 8, 2003

(51) Int. Cl.[7] .................. B29C 71/00; B29C 71/02
(52) U.S. Cl. ................. 264/234; 264/237; 264/345; 264/348
(58) Field of Search ................ 264/234, 237, 264/345, 348

(56) References Cited

U.S. PATENT DOCUMENTS

| | | | |
|---|---|---|---|
| 5,136,515 A | 8/1992 | Helinski | |
| 5,141,680 A | 8/1992 | Almquist et al. | |
| 5,252,264 A | 10/1993 | Forderhase et al. | |
| 5,503,785 A | 4/1996 | Crump et al. | |
| 5,555,176 A | 9/1996 | Menhennett et al. | |
| 5,617,911 A | 4/1997 | Sterett et al. | |
| 5,866,058 A | 2/1999 | Batchelder et al. | |
| 6,132,665 A | 10/2000 | Bui et al. | |
| 6,259,962 B1 | 7/2001 | Gothait | |

FOREIGN PATENT DOCUMENTS

| | | |
|---|---|---|
| WO | 97/11837 A1 | 4/1997 |
| WO | 01/26023 A1 | 4/2001 |

*Primary Examiner*—Leo B. Tentoni
(74) *Attorney, Agent, or Firm*—James E. Curry; Ralph D'Alessandro

(57) ABSTRACT

A method for removing supports from a three-dimensional objected formed by selective deposition modeling. The three-dimensional object is formed from a curable phase change material and the supports are formed from a non-curable phase change material. The curable phase change material contains between about 5% to about 25% of a non-reactive wax in order to achieve the desired phase change characteristics of the material. When removing the supports with heat, discoloration undesirably occurs in the three-dimensional object as the non-reactive wax migrates within the object. The method prevents wax migration by cooling the object slowly past the freezing point of the build material such that a temperature differential no greater than about 5° C. is present within the object. With the preferred build material having a freezing point of about 49.5° C., this is achieved by lowering the temperature between about 62° C. to about 52° C. over a period of between about 5 to about 10 minutes so that the temperature of the regions of the object remain substantially equal as the freezing point is crossed during cooling.

43 Claims, 1 Drawing Sheet

POST PROCESSING THREE-DIMENSIONAL OBJECTS FORMED BY SELECTIVE DEPOSITION MODELING

BACKGROUND OF THE INVENTION

1. Field of the Invention

The invention relates in general to solid deposition modeling, and in particular to a post processing technique to remove a non-curable phase change support material from a three-dimensional object formed from a curable phase change build material.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF". Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Generally, in most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM" a phase change build material is jetted or dropped in discrete droplets, or extruded through a nozzle, to solidify on contact with a build platform or previous layer of solidified material in order to build up a three-dimensional object in a layerwise fashion. Other synonymous names for SDM used in this new industry are: solid object imaging, solid object modeling, deposition modeling, multi-jet modeling, three-dimensional printing, thermal stereolithography, and the like. Often, a thermoplastic material having a low-melting point is used as the solid modeling material, which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al. Some thermoplastic build materials used in SDM are available and sold under the names Thermojet® 2000 and Thermojet® 88 by 3D Systems, Inc. of Valencia, Calif. Also, some formulations for thermoplastic phase change build materials are disclosed in U.S. Pat. No. 6,132,665 to Bui et al.

Recently, there has developed an interest in utilizing curable phase change materials in SDM. One of the first suggestions of using a radiation curable build material in SDM is found in U.S. Pat. No. 5,136,515 to Helinski, wherein it is proposed to selectively dispense a UV curable build material in a SDM system. Some of the first UV curable material formulations proposed for use in SDM systems are found in Appendix A of International Patent Publication No. WO 97/11837, where three reactive material compositions are provided. More recent teachings of using curable materials in three-dimensional printing is provided in U.S. Pat. No. 6,259,962 to Gothait and in International Publication Number WO 01/26023.

However, one of the most fundamental problems associated with SDM processes is the adverse effects resulting from gravitational forces that undesirably act on a part during the build process. All SDM processes must deal with gravitational forces. For example, most downward facing surfaces built by SDM processes need special supports in order to stabilize the part during the build process.

One method of supporting the three-dimensional object to counter the gravity problem is to utilize dissimilar materials in the build process. For example, two different solidifying materials can be selectively deposited in a layer by layer process, one material for building the part, and the other material for building the support structure. There are generally four recognized methods for removing dissimilar support material for an SDM object. Three of the methods were initially proposed in U.S. Pat. No. 5,136,515 to Helinski. The first three methods are 1) removing the support material by physical force, 2) removing the support material by application of heat, 3) removing the support material by chemical means. The forth method, having little applicability to SDM techniques, involves utilizing a powder as a support material that does not adhere to the object.

In the first separation approach, the materials are carefully selected to order to establish a weak bond joint at their juncture such that the application of an applied force separates the support structure from the part along the joint. For example, this approach is described in U.S. Pat. No. 5,617,911 to Sterett et al and in International Publication WO 01/26023 of Objet Geometries Ltd., in Rehovot, Israel. Undesirably, the application of applied force to crack or crumble away the support material from the object has limitations. For instance it is difficult, and sometimes impossible, to remove the support material for certain geometric configurations, such as in deep cavities or pockets. Further, delicate features of the three-dimensional object can be broken or damaged during the removal process.

The second separation approach is to select a support material having a lower melting point than the material of the formed object. After forming the object and support structure, the temperature of the composite is raised in order to melt out the support structure. This type of approach is described in, for example, U.S. Pat. No. 5,141,680 to Almquist et al.

The third approach is to select a support material that is soluble in a solvent in which the build material is not. After forming the object and support structure the two are submersed into the solvent in order to dissolve away the support. One problem with this approach is that as the solvent starts to saturate with removed support material, and eventually new solvent is needed. The disposal of the used solvent can be problematic. In addition, evaporative issues can arise resulting in the production of odors, and the like, when working with solvents. Thus, implementing this approach may not be user friendly or cost effective.

In the fourth approach a removable support material is deposited in particulate form, such as a powder, that is energized so as to fuse to form the part, with the unfused powder acting as the support structure. This type of approach is described in, for example, U.S. Pat. No. 5,252,264 to Forderhase et al. Undesirably, however, this approach is limited for use with sintered powder materials and is generally unsuitable in applications utilizing flowable solid modeling materials to build parts.

According to the present invention, a preferred build material is an acrylate/wax based curable phase change material, and a preferred support material is a wax based non-curable phase change material. It was initially envisioned to remove the support material by application of heat whereby the support material would melt away. However, initial post processing tests utilizing heat to remove the support material undesirably effected the three-dimensional object. The thermal processing apparently caused the otherwise transparent acrylate in the object to become clouded and opaque. Further, the discoloration was not uniform throughout the object.

Thus, there is a need to develop a method and apparatus capable of removing a phase change support material dispensed to support a three-dimensional object formed from a curable phase change build material without undesirably effecting the three-dimensional object. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to successfully remove supports formed from a phase change material from a three-dimensional object formed from a cured phase change material.

It is another aspect of the present invention to successfully separate supports from a three-dimensional object without undesirably effecting the underlying three-dimensional object.

It is a feature of the present invention that by the proper application of heat the supports can be melted and removed from the three-dimensional object without discoloring the object.

It is another feature of the present invention that after the support material has been melted and removed, that the temperature of the three-dimensional object is lowered to just above the freezing point of the build material and then lowered below the freezing point at a rate wherein a temperature differential within the regions of the three-dimensional object does not exceed about 5° C.

It is an advantage of the present invention that the non-curable wax content in the build material is prevented from migrating within the matrix of build material of the three-dimensional object when post processing the object to remove the support material.

These and other aspects, features, and advantages are achieved/attained in the method of the present invention for post processing an article formed by selective deposition modeling, the article comprising a three-dimensional object and a support structure, the three-dimensional object formed from a curable phase change composition and the support structure formed from a non-curable phase change composition. The post processing method comprises:

providing a temperature controllable environment for the article having an initial temperature above the melting point of the non-curable phase change composition;

placing the article in the temperature controllable environment;

holding the temperature of the controllable environment above the melting point of the non-curable phase change composition until substantially all of the support structure transitions to a flowable state and is removed from the three-dimensional object;

lowering the temperature of the controllable environment to a temperature just above the freezing point of the curable phase change composition;

holding the temperature of the controllable environment just above the freezing point of the curable phase change composition until the temperature of all the regions of the three-dimensional object substantially equalize; and lowering the temperature of the three-dimensional object below the freezing point of the curable phase change composition at a rate wherein a temperature differential within the regions of the three-dimensional object does not exceed about 5° C.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the FIGURE.

DETAILED DESCRIPTION OF THE PREFERRED EMBODIMENTS

Figure 1:
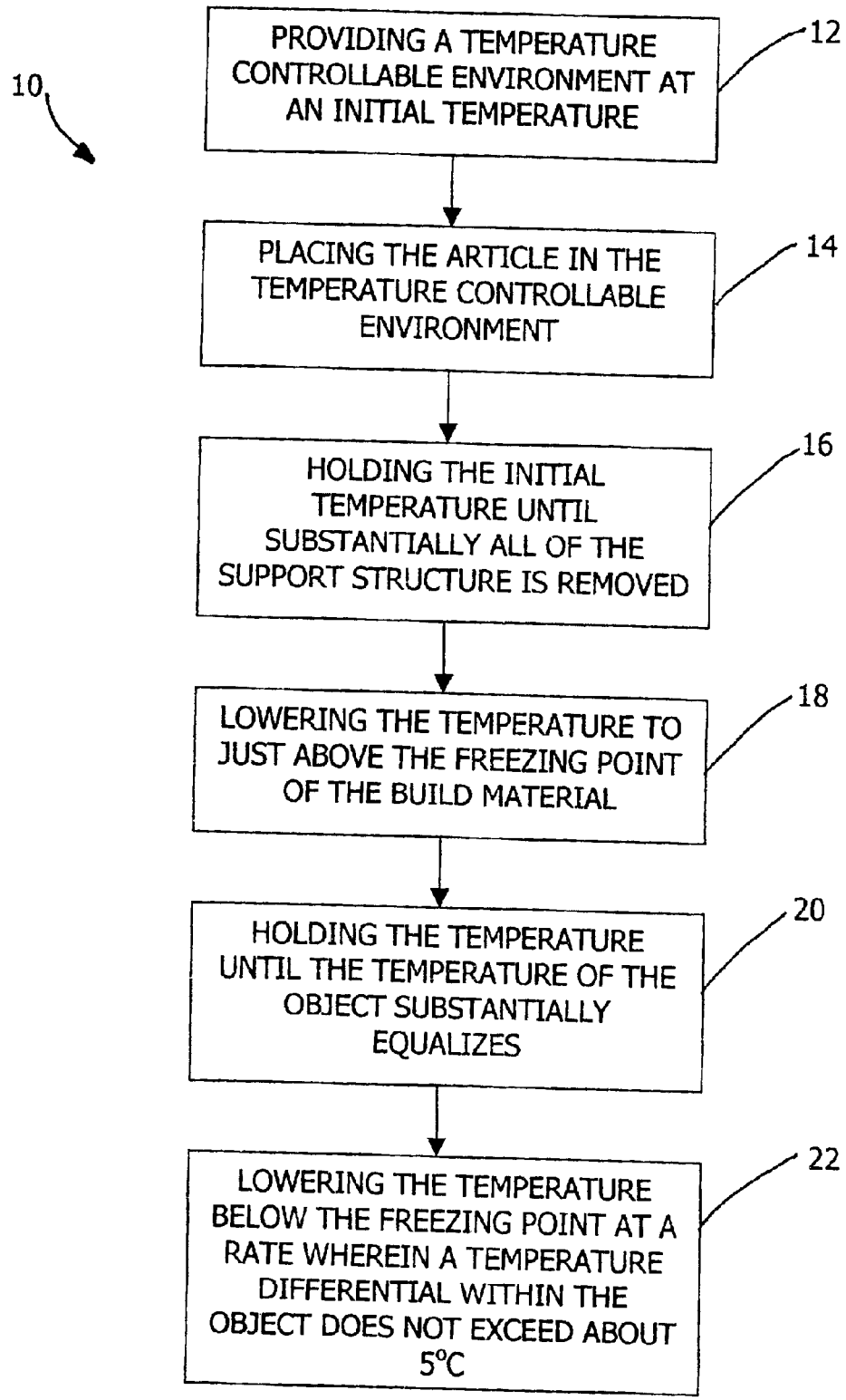
FIG. 1 is a flow chart of the post processing method of the present invention.

While the present invention is applicable to all SDM techniques and objects made therefrom, the invention will be described with respect to a SDM technique utilizing an ink jet print head dispensing a ultraviolet radiation curable phase change material. However it is to be appreciated that the present invention can be implemented with any SDM technique utilizing a wide variety of curable phase change materials. For example, the curable phase change material can be cured by exposure to actinic radiation having wavelengths other than in the ultraviolet band of the spectrum, or by subjecting the material to thermal heat.

As used herein, the term "a flowable state" of a build material is a state wherein the material is unable to resist shear stresses that are induced by a dispensing device, such as those induced by an ink jet print, head when dispensing the material, causing the material to move or flow. Preferably the flowable state of the build material is a liquid state, however the flowable state of the build material may also exhibit thixotropic-like properties. A material is in a flowable state when the temperature of the material is above the material's melting point. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel stale, a paste state, or a thixotropic state, are examples of a non-flowable state of a build material is a state wherein the material is sufficiently self-supportive under its own weight so as to hold its own shape. A build material existing in a solid state, a gel state, a paste state, or a thixotropic state, are examples of a non-flowable state of a build material for the purposes herein. A material is iii a non-flowable state when the temperature of the material is below the material's freezing point. In addition, the term "cured" or "curable" refers to any polymerization reaction. Preferably the polymerization reaction is triggered by exposure to actinic radiation or thermal heat. Most preferably the polymerization reaction involves the cross-linking of monomers and oligomers initiated by exposure to actinic radiation in the ultraviolet or infrared wavelength band. Further, the term "cured statc" refers to a material, or portion of a material, in which the polymerization reaction has substantially completed. It is to be appreciated that as a general matter the material can easily transition between the flowable and non-flowable state prior to being cured. However, once cured, the material cannot transition back to a flowable state and be dispensed by the apparatus.

A preferred build material and support material is disclosed in the concurrently filed U.S. patent application Ser. No. 09/971,247; filed Oct. 3, 2001, entitled "Ultra-Violet Light Curable Hot Melt Composition", which is herein incorporated by reference as set forth in full. The materials preferably have a melting point from about 45° C. to about 65° C., a freezing point from about 33° C. to about 60° C., and a jetting viscosity of about 10 to about 16 centipoise at the dispensing temperature. A preferred method and apparatus for dispensing the preferred materials to form a three-dimensional object and underlying support structure is disclosed in the concurrently filed U.S. patent application Ser. No. 09/971,337 filed Oct. 3, 2001, entitled "Selective Deposition Modeling with Curable Phase Change Materials", which is herein incorporated by reference as set forth in full. The preferred dispensing temperature is about 80° C.

In general, both materials are dispensed in a layerwise manner during the SDM build process, and a planarizer is driven over each layer to normalize the layers during the build process. The build material is a photocurable acrylate/wax blend, and the support material is primarily a wax. After all the layers are formed it was envisioned that the support material could be easily and effectively removed by heating the object and support structure above the melting point of the support material, causing the support material to melt away to reveal the three-dimensional object.

Four formulations of the build material are provided by weight percent in Table 1. The preferred build material is Example 4 in Table 1 because it was determined to be the most durable. The materials had the following physical properties as shown in Table 2.

TABLE 1

| Mfg. ID No. | General Component Name | Ex. 1 | Ex. 2 | Ex. 3 | Ex. 4 |
|---|---|---|---|---|---|
| CN980 | Urethane Acrylate | 7.2% | | | 6.5% |
| CN981 | Urethane Acrylate | | | 26% | |
| E3200 | Epoxy Acrylate | | | 14% | 6.0% |
| CN975 | Hexafunctional Urethane Acrylate | | 7.2% | | |
| CN2901 | Urethane Acrylate | 27.5% | 27% | | 18.7% |
| SR203 | Tetrahydrofurfuryl Methacrylate | | | | |
| SR205 | Triethylene glycol dimethacrylate | 33% | | 46.5% | 41.05% |
| SR340 | 2-phenoxyethyl methacrylate | | | | |
| SR313 | Lauryl methacrylate | | 18% | | |
| SR454 | Ethoxylated₃ Trimethylolpropane Triacrylate | 4.5% | | | |
| SR604 | polypropylene glycol monomethacrylate | | | | 12.0% |
| CD406 | Cyclohexane dimethanol diacrylate | | 30% | | |
| SR493D | Tridecyl Methacrylate | 19% | | | |
| ADS038 | Urethane wax | 7% | 5.3% | 10% | 10.0% |
| ADS043 | Urethane wax | 4.3% | 6% | 1.5% | 2.0% |
| I-184 | Photo-initiator | 2% | 2% | 2% | 3.75% |
| TOTAL | | 100% | 100% | 100% | 100.0% |

TABLE 2

| Property | Ex. 1 | Ex. 2 | Ex. 3 | Ex. 4 |
|---|---|---|---|---|
| Viscosity at 80° C. | 12.9 cps | 12.9 cps | 12.9 cps | 12.8 cps |
| Melting point ° C. | 52° C. | 55° C. | 57° C. | 56° C. |
| Freezing point ° C. | 46° C. | 47.5° C. | 50° C. | 49.5° C. |
| Elongation % E (after cure) | 9% | 4% | 5% | 11.3% |

The following components used in the four formulations listed in Table 1 are available from Sartomer Company, Inc. of Exton Pa. under the following designations: CN 980, CN 981, CN 975, CN2901, SR 203, SR 205, SR 340, SR 313, SR 454, CD 406, SR604, and SR 493D. The components ADS 038 and ADS 043 are available from American Dye Source, Inc. of Quebec, Canada. The epoxy acrylate under the designation E 3200 is available from UCB Chemical, Inc. of Atlanta, Ga. The photoinitiator under the designation 1–184 listed is available from Ciba Specialty Chemicals, Inc. of New York, N.Y.

The formulations in Table 1 where made in accordance with the present invention by mixing the individual components in a kettle equipped with a mixing blade. A kettle was preheated to about 85° C. and the components placed into the kettle, the kettle closed and stirring was commenced. Stirring continued as the components eventually equalized to the temperature of the kettle. Stirring was then continued until a homogenized molten state was achieved. The viscosity was measured and adjusted as needed. It took approximately 2.5 hours to mix a 75-pound quantity of the formulations to a homogenized state. The build material formulations were then removed from the kettle and filtered through a 1-micron absolute filter while in the flowable state. The formulations were then cooled to ambient temperature at which they transitioned from the flowable to the non-flowable state.

It is to be appreciated that the curable phase change build material formulations contain between about 5% to about 25% by weight of a non-reactive wax. In the preferred embodiment, the non-reactive wax content is between about 10% to about 12% by weight, and is comprised of a urethane wax. However, other non-reactive waxes could be used such as carbon hydrogenated waxes, paraffin waxes, fatty ester waxes, and the like. The wax content is necessary in order to provide the appropriate phase change characteristics of the build material so that the material will solidify after being dispensed. This wax, which does not cure when exposed to actinic radiation, is trapped within the cured matrix of the polymerized reactive components of the build material formulation.

Because the materials are dispensed from the same dispensing device, the support materials have similar melting points, freezing points, and viscosity values at the dispensing temperature. Hence, the support material is formulated to have similar phase change characteristics as the curable phase change build material, and preferably the characteristics are identical when possible. The preferred non-curable phase change support material comprises 70% by weight octadecanol available from Ruger Chemical Co., Inc., of Irvington, N.J., and 30% by weight of a tackifier sold under the designation of KE 100 available from Arakawa Chemical (USA) Inc., of Chicago, Ill. This support material formulation has a viscosity of about 11.0 centipoise at a temperature of about 80° C., and a melting point of about 58° C. and a freezing point of about 49.5° C. The formulation was mixed in a kettle equipped with a mixing blade. The kettle is preheated to about 85° C. and the octadecanol is placed into the kettle first, as it has the lower melting point. The kettle is closed and stirring commenced. Once the octadecanol has melted, the KE 100 is added to the mixture while stirring continues. The kettle is closed and stirring continues until a homogenized state of the mixture is achieved. The viscosity is measured and adjusted if needed. The formulation is then removed from the kettle and filtered through a 1-micron absolute filter while in the flowable state. The formulation is then cooled to ambient temperature wherein it transitions from the flowable to the non-flowable state.

Test specimens were formed by an SDM apparatus utilizing the piezoelectric Z850 print head used in the Phaser® 850 printer available from Xerox Corporation's Office Products Business Unit of Wilsonville, Oreg. The Z850 print head was configured to also dispense a non-curable phase change support material as well as the curable phase change build material. The Z850 print head was modified to dispense the materials at a temperature of about 80° C. Both materials solidified generally upon contact in the layer being formed during the build process, and after each layer was formed the layers were cured by exposure to actinic radiation. Only the reactive polymers in the dispensed build material were cured by the exposure to actinic radiation which initiated the polymerization reaction. Hence, the test specimens comprised a matrix of cured build material dispersed with between about 5% to about 25% by weight of a non-reactive wax, and the matrix being partially surrounded by solidified support material.

A variety of test specimens having different geometric shapes were made. The test specimens needed to be generally representative of the variety of geometric shapes that can be made by SDM. Thin disks were made that were about ⅛ inch thick having a diameter of about 2 inches. Thick disks were made that were between about 1 and 2 inches thick having a diameter of about 2 inches. A thin-walled 90-degree tubular elbow was also made for testing, as was a thin walled cell phone shell structure.

The test specimens were used in order to develop an appropriate method for removing the support material. Generally it was preferred to develop a method relying on thermal heat to bring the support material back to a flowable state to melt the support material away and reveal the three-dimensional object. A number of methods were tried to provide thermal heat to melt away the support material. Some of the first tests involved placing the test parts in a vat of organic oil at a temperature of about 90° C. and allowing the support material to melt and settle to the bottom of the vat. Peanut oil was used. The liquid vat was also physically agitated so as to assist in drawing the melted support material away from the three-dimensional object. In other tests mineral oil was also used as the heat transferring medium in the vat. In other tests the specimens were placed in an oven at a temperature of about 90° C. and the support material allowed to melt and run off the underlying objects and into container. Thus, organic oil, mineral oil, and air were used as the heat transferring medium in many of the tests.

The initial post processing tests utilizing heat to remove the support material undesirably effected the three-dimensional object. The test specimens were initially placed in a temperature controlled environment between about 90° C. to about 200° C. to melt away the support material, and were then brought to room temperature within 5 to 20 minutes. The thermal processing apparently caused the otherwise transparent acrylate in the object to become clouded and opaque. Further, the discoloration was not uniform throughout the object. Thin features appeared transparent and thick features appeared opaque. A variety of different thermal processing steps were attempted to remove the supports, however internal discoloring of the three-dimensional object still occurred. It was not readily apparent what was causing the undesirable discoloration effect during post processing.

It was theorized that the discoloration occurs due to thermal stresses resulting during part cooling causing the wax content that permeates the matrix of cured build material to migrate to regions of lower compressive stresses during post processing. The liquid wax is believed to move in capillary like fashion towards regions of the part which remain above the freezing point of the build material composition. As the part cools rapidly below the freezing point, generally below about 70° C., the external regions cool before the internal regions of the part. As the outer regions cool and contract faster than the inner regions, the wax component in the build material is believed to migrate towards the inner regions of the three-dimensional object, and the inner portions then solidify with a substantially higher volume percentage of the wax component. It is believed that this produces objects undesirably having transparent edges and opaque centers. It is believed the transparent edges of the objects are from where the wax content had migrated, and the opaque centers of the objects are to where the wax content had migrated.

It was then proposed that by cooling the part slowly and evenly after the support material has been substantially melted and removed, the wax component in the build material would be prevented from becoming transient. It was believed this would eliminate the undesirable discoloration effects. Test specimens were placed in a temperature controlled vat of oil. The temperature of the vat was initially raised to between about 90° C. and about 150° C. prior to placing the specimens in the vat. The support material melted and settled to the bottom of the vat. The temperature in the vat was then controllably lowered to room temperature very slowly so that the temperature of the regions of the specimens would remain substantially equal and not vary by more than 5° C. at any point in time. The specimens processed in this manner did not exhibit any of the undesirable discoloring effects previously shown. Thus, it was determined that by keeping the temperature differential of the regions within the three-dimensional object between less than about 5° C. at any point in time during the cooling process, the undesirable discoloring effects are eliminated. Alternatively stated, if the temperature of the regions of the three-dimensional object remain substantially equal during the cooling process, the undesirable discoloring effects are eliminated. However, it is undesirable to maintain this temperature differential during the entire cooling process as the process would take too long, particularly for large three-dimensional objects.

It was then proposed that the 5° C. temperature differential need only be maintained when cooling the specimens past the freezing point of the build material. This was investigated by placing specimens in a temperature controlled environment comprising a heated vat of oil. The temperature of the vat was initially raised to between about 90° C. and about 150° C. prior to placing the specimens in the vat. After the specimens were placed in the vat the support material melted and settled to the bottom. The temperature of the vat was then lowered to about 75° C. The temperature in the vat was then controllably lowered between about 75° C. to about 40° C. so that the temperature of the regions of the specimens would remain substantially equal as the freezing point of the build material composition was crossed. After the freezing point was crossed, most of the specimens were removed from the vat and allowed to return to ambient temperature. It was determined from further testing that cooling the specimens from between about 65° C. to about 45° C. over a period of between about 5 to about 10 minutes eliminated the discoloration effects discussed previously, in which the freezing point of the build material composition was within this temperature range, such as the preferred build material in example 4 of Table 1 which has a freezing point of about 49.5° C. Thus, it was discovered that lowering the temperature between about 65° C. to about 45° C. over a period of between about 5 to about 10 minutes allows the temperature of the regions of the specimens to remains substantially equal as the freezing point is crossed during the cooling.

It was also found that initial melting temperatures generally above about 150° C. caused the cured components in the objects to crack and/or delaminate. Some specimens heated above about 150° C. give the appearance of having trapped bubbles, and some turned yellow. Thus, it was determined the initial temperature for removing the support material should not be raised above about 150° C. It was further found that the support material could be effectively removed from the three-dimensional objects at temperatures between about 90° C. and about 150° C., and preferably between about 120° C. and about 125° C.

Further experimentation was conducted with mineral oil as the liquid heat transferring medium in the vat instead of organic oil. Mineral oil as the heat transferring medium also provided successful results. When using organic oil such as peanut oil, slight yellowing was detected on the resultant objects, however no yellowing was present when using mineral oil. If desired, other liquid mediums could be used as well, such as water. If water is used, the support material can easily be removed from the water, as it will float on the top surface of the water. When using water, the initial temperature should generally not exceed about 100° C., however coolant additives such as ethylene glycol can be included to prevent boiling at higher temperatures. Petroleum distillate based oils were also tried as a means for removing the support material with the hopes that the oil would help dissolve the wax material in the support material. The support material did melt, however the distillate penetrated the build material and appeared to dissolve and remove the constituent wax component of the build material. This left a bright white part without any transparency.

It is to be appreciated that there are a variety of ways to provide a temperature controllable environment for the post processing steps of the present invention. Instead of providing a liquid heat transferring medium in a vat, an oven operated in air can be used. Further, some of the steps can be executed with one temperature controllable device utilizing one heat transferring medium and other steps executed by a different temperature controllable device utilizing a different heat transferring medium. For instance, an oven can be used to initially remove a substantial amount of the support material, and the object can then be placed in a liquid vat for removing any residual support material. In this case a catch tank can acquire the substantial amount of support material removed by the oven, thereby reducing the quantity residing in the liquid vat. Because the support material in the liquid vat at some point must be removed, it is desirable to minimize the quantity of support material in the vat of liquid as much as possible. Alternatively, a vat of liquid support material can be provided for initially removing the support material instead of an oven. This would be advantageous as the non-curable phase change support material composition in a flowable state can be the heat transferring medium, and the material can be recycled without the need to separate the material from some dissimilar liquid heat transferring medium such as water or oil.

Other heat transferring mediums can be used as well. For instance, a bed of particles can be used, in which capillary action of the particles can assist in the removal of support material. If desired, a fluidized bed of particles can be used. The particles can be any solid composition of matter that does not melt when subjected to temperatures of about 150° C. For example, nearly any metal, mineral, ceramic, or combination thereof, could be used as the particulate matter. However to submerse an article in a particulate bed may require the assistance of agitation and vibration. If needed, such assistance must be sufficiently gentle such that delicate features of the underlying three-dimensional object are not damaged.

Referring to FIG. 1, the post processing procedure of the present invention is generally identified by numeral 10. The post processing procedure 10 involves providing a temperature controllable environment for the article at an initial temperature 12, followed by placing the article in the temperature controllable environment 14. The initial temperature is above the melting temperature of the support material so as to cause it to transition to a flowable state. The next step identified by numeral 16 involves holding the temperature of the controllable environment above the melting point of the phase change support structure until substantially all of the support material of the article is removed from the three-dimensional object. The next step identified by numeral 18 involves lowering the temperature of the three-dimensional object to a temperature just above the freezing point of the build material composition. The temperature just above the freezing point should be no more than about 15° C. above the freezing point so that the post processing will not take too long. The next step identified by numeral 20 involves holding this temperature until the temperature of all the regions of the three-dimensional object substantially equalize. Generally about 20 minutes is needed for the temperature of the three-dimensional object to equalize throughout all regions of the object. The final step identified by numeral 22 involves slowly lowering the temperature of the three-dimensional object below the freezing point of the build material composition while keeping the temperature of the regions of the three-dimensional object substantially equal as the freezing point is crossed during the cooling step. Preferably the rate at which the temperature is lowered is sufficiently gradual such that a temperature differential within the three-dimensional object does not exceed about 5° C. at any time during cooling, and particularly when crossing the freezing point of the build material. Preferably the freezing point is crossed by about 5° C. below the freezing point, at which the three-dimensional object can be returned to ambient conditions at about any desired rate.

The use of hot organic based oils produced several advantages over other heating transferring mediums. For example, the peanut oil used in the experiments has a slightly lower density than cured material forming the specimens. This small density difference allows the part to remain submerged and nearly weightless during heating while also providing a means for transporting the melted material away from the part, as it will sink to the bottom of the vat. At about 120° C. the hot oil is reasonably safe to touch, and the entire post processing steps to remove the support material can be completed in under an hour. In addition, these organic oils, such as vegetable oil, peanut oil, sunflower oil, and the like, are non-toxic.

A preferred method of post processing an article formed by SDM initially comprises providing a temperature controllable environment comprising an oven with the heat transferring medium being air. The temperature of the oven is initially raised above the melting point of the phase change support structure, and the article is then placed in the oven. Preferably the temperature is between about 80° C. and about 150° C., and more preferably to between about 120° C. to about 125° C. At this temperature the phase change support structure melts. The temperature is maintained for about 20 minutes so that substantially all of the support material is removed from the underlying three-dimensional object. The support material is drained into a container for disposal or recycling. This is done to remove a substantial amount of the support material prior to placing the three-dimensional object in a liquid heat transferring medium to remove the residual material. This substantially reduces the quantity of support material that must later be removed from the liquid.

The three-dimensional object is then submersed in a vat of liquid at a temperature of between about 80° C. and about 150° C. Preferably the liquid is mineral oil, although other liquids could be used, such as organic oil or water. The vat is held at this temperature for about 20 minutes as the mineral oil is continuously stirred so as to remove the residual support material from the object. Preferably the temperature of the mineral oil is near the temperature at which the bulk of support material was removed in the oven. Stirring is accomplished with a paddle wheel provided within the container of mineral oil that is rotably driven at a constant angular velocity. While the mineral oil is continuously stirred, the residual support material settles to the bottom of the vat.

Next the temperature of the three-dimensional object is lowered to a temperature just above the freezing point of the build material composition, such as about 75° C., and held there for about 20 minutes. For the preferred build material, the temperature is lowered to above about 62° C., and is held there for about 20 minutes. Holding the temperature for about 20 minutes allows all the temperature of all the regions of the three-dimensional object to substantially equalize. The temperature is then slowly lowered below the freezing point temperature of the build material composition, such as to about 40° C. Lowering the temperature between about 75° C. to about 40° C. over a period of between about 15 minutes allows the temperature of the regions of the three-dimensional object to remain substantially equal as the freezing point is crossed during the cooling process. For the preferred build material, the temperature is lowered between about 62° C. to about 52° C. over a period of between about 10 minutes. Afterwards, the temperature of the three-dimensional object is returned to room temperature. Preferably the object is removed from the mineral oil and allowed to air dry.

The final step is a soapy water rinse with a liquid detergent at a temperature between 20° C. to about 50° C. This allows for the removal of any residual mineral oil and particles of support material from the surface of the object. A preferred liquid dishwashing detergent used is DAWN® liquid dish detergent available from Procter & Gamble of Cincinnati, Ohio. Preferably the steps are automated and performed by a single post processing apparatus. After the soapy water rinse the three-dimensional object is then air dried and cooled to atmospheric conditions.

What has been described are preferred embodiments in which modifications and changes may be made without departing from the spirit and scope of the accompanying claims.

What is claimed is:

1. A method of post processing an article formed by selective deposition modeling to remove a support structure, the article comprising a three-dimensional object and the support structure, the three-dimensional object formed from a curable phase change composition and the support structure formed from a non-curable phase change composition, the method comprising the following steps:

(a) providing a temperature controllable environment for the article having an initial temperature above the melting point of the non-curable phase change composition;

(b) placing the article in the temperature controllable environment;

(c) holding the temperature of the controllable environment above the melting point of the non-curable phase change composition until substantially all of the support structure transitions to a flowable state and is removed from the three-dimensional object;

(d) lowering the temperature of the controllable environment to a temperature just above the freezing point of the curable phase change composition;

(e) holding the temperature of the controllable environment just above the freezing point of the curable phase change composition until the temperature of all the regions of the three-dimensional object substantially equalize; and (f) lowering the temperature of the three-dimensional abject below the freezing point of the curable phase change composition at a rate wherein a temperature differential within the regions of the three-dimensional object does nor exceed about 5° C.

2. The method of claim 1 wherein the temperature controllable environment includes at least one heat transferring medium.

3. The method of claim 2 wherein the heat transferring medium is air.

4. The method of claim 2 wherein the heat transferring medium is a solid.

5. The method of claim 4 wherein the solid heat transferring medium comprises a plurality of particulate matter.

6. The method of claim 2 wherein the heat transferring medium is a liquid.

7. The method of claim 6 wherein the liquid is an organic oil, a mineral oil, water, or the non-curable phase change composition in a flowable state.

8. The method of claim 2 wherein steps (a) (b) and (c) are completed in a heal transferring medium of air, and the steps (d) (e) and (f) are completed in a liquid heat transferring medium.

9. The method of claim 1 wherein the step of holding the temperature of the controllable environment above the melting point is accomplished for a time period of at least about 20 minutes.

10. The method of claim 1 wherein the step of holding the temperature of the controllable environment just above the freezing point is accomplished for a time period of at least about 20 minutes.

11. The method of claim 1 wherein the step of lowering the temperature of the three-dimensional object below the freezing point is accomplished through a temperature range of between about 75° C. to about 40° C.

12. The method of claim 1 wherein the step of lowering the temperature of the three-dimensional object below the freezing point is accomplished through a temperature range of between about 62° C. to about 52° C. for a period of time between about 5 minutes to about 10 minutes.

13. A method of post processing an article formed by selective deposition modeling, the article comprising a three-dimensional object and a support structure, the three-dimensional object formed from a curable phase change composition and the support structure formed from a non-curable phase change composition, the method comprising the following steps:

(a) providing a temperature controllable environment for the article having an initial temperature above the melting point of the non-curable phase change composition;

(b) placing the article in the temperature controllable environment;

(c) holding the temperature of the controllable environment above the melting point of the non-curable phase change composition until substantially all of the support structure transitions to a flowable state and is removed from the three-dimensional object;

(d) lowering the temperature of the controllable environment to a temperature just above the freezing point of the curable phase change composition;

(e) holding the temperature of the controllable environment just above the freezing point of the curable phase change composition until the temperature of all the regions of the three-dimensional object substantially equalize; and (f) lowering the temperature of the three-dimensional object below the freezing point of the curable phase change composition at a rate wherein the temperature of the regions of the three-dimensional object remain substantially equal as the freezing point is crossed.

14. The method of claim 13 wherein the temperature controllable environment includes at least one heat transferring medium.

15. The method of claim 14 wherein the heat transferring medium is air.

16. The method of claim 14 wherein the heat transferring medium is a solid.

17. The method of claim 16 wherein the solid heat transferring medium comprises a plurality of particulate matter.

18. The method of claim 14 wherein the heat transferring medium is a liquid.

19. The method of claim 14 wherein the liquid is an organic oil, a mineral oil, water, or the non-curable phase change composition in a flowable state.

20. The method of claim 13 wherein steps (a) (b) and (c) are completed in a heat transferring medium of air, and the steps (d) (e) and (f) are completed in a liquid heat transferring medium.

21. The method of claim 13 wherein the step of holding the temperature of the controllable environment above the inciting point is accomplished for a time period of at least about 20 minutes.

22. The method of claim 13 wherein the step of holding the temperature of the controllable environment just above the freezing point is accomplished for a time period of at least about 20 minutes.

23. The method of claim 13 wherein the step of lowering the temperature of the three-dimensional object below the freezing point is accomplished through a temperature range of between about 75° C. to about 40° C.

24. The method of claim 13 wherein the step of lowering the temperature of the three-dimensional object below the freezing point is accomplished through a temperature range of between about 62° C. to about 52° C. for a period of time between about 5 minutes to about 10 minutes.

25. A method of post processing an article formed by selective deposition modeling to remove a support structure, the article comprising a three-dimensional object and the support structure, the three-dimensional object formed from a curable phase change composition and the support structure formed from a non-curable phase change composition, the method comprising the following steps:

(a) providing a temperature controllable environment for the article having an initial temperature above the melting point of the non-curable phase change composition;

(b) placing the article in the temperature controllable environment;

(c) removing substantially all of the support structure in a flowable state from the article;

(d) lowering the temperature of the controllable environment to a temperature just above the freezing point of the curable phase change composition and allowing the temperature of all the regions of the three-dimensional object to substantially equalize;

(e) lowering the temperature of the three-dimensional object below the freezing point of the curable phase change composition at a rate wherein a temperature differential within the regions of the three-dimensional object does not exceed about 5° C.

26. The method of claim 25 wherein the temperature controllable environment includes at least one heat transferring medium.

27. The method of claim 26 wherein the heat transferring medium is air.

28. The method of claim 26 wherein the heat transferring medium is a solid.

29. The method of claim 28 wherein the solid heat transferring medium comprises a plurality of particulate matter.

30. The method of claim 26 wherein the heat transferring medium is a liquid.

31. The method of claim 30 wherein the liquid is an organic oil, a mineral oil, water, or the non-curable phase change composition in a flowable state.

32. The method of claim 26 wherein steps (a) (b) and (c) are completed in a heat transferring medium of air, and the steps (d) and (e) are completed in a liquid heat transferring medium.

33. The method of claim 25 wherein the step of lowering the temperature of the three-dimensional object below the freezing point is accomplished through a temperature range of between about 75° C. to about 40° C.

34. The method of claim 25 wherein the step of lowering the temperature of the three-dimensional object below the freezing point is accomplished through a temperature range of between about 62° C. to about 52° C. for a period of time between about 5 minutes to about 10 minutes.

35. The method of claim 2 wherein the melting point of the non-curable phase change composition is between about 45° C. to about 65° C., and the freezing point of the curable phase change composition is between about 33° C. to about 60° C.

36. The method of claim 35 wherein the heat transferring medium is selected from the group consisting of air and water.

37. The method of claim 36 wherein steps (a) through (f) are completed in the heat transferring medium of water.

38. The method of claim 14 wherein the melting point of the non-curable phase change composition is between about 45° C. to about 65° C., and the freezing point of the curable phase change composition is between about 33° C. to about 60° C.

39. The method of claim 38 wherein the heat transferring medium is selected from the group consisting of air and water.

40. The method of claim 39 wherein steps (a) through (f) are completed in the heat transferring medium of water.

41. The method of claim 26 wherein the melting point of the non-curable phase change composition is between about 45° C. to about 65° C., and the freezing point of the curable phase change composition is between about 33° C. to about 60° C.

42. The method of claim 41 wherein the heat transferring medium is selected from the group consisting of air and water.

43. The method of claim 42 wherein steps (a) through (e) are completed in the heat transferring medium of water.

* * * * *